United States Patent [19]

Gaddis et al.

[11] 4,200,533

[45] Apr. 29, 1980

[54] HYPERFILTRATION APPARATUS AND METHOD OF FLUID TREATMENT

[76] Inventors: Joseph L. Gaddis, 112 Brookwood La.; Craig A. Brandon, 103 Crestwood Dr.; Donald K. Todd, Booker Springs Rd.,, all of Clemson, S.C. 29631

[21] Appl. No.: 919,935

[22] Filed: Jun. 28, 1978

[51] Int. Cl.² .............................................. B01D 31/00
[52] U.S. Cl. .............................. 210/195.2; 210/195.3; 210/336; 210/433 M
[58] Field of Search ...................... 210/22, 23 F, 23 H, 210/496, 336, 5 WM, 433 M, 195.2, 195.3

[56] References Cited

U.S. PATENT DOCUMENTS

| 1,825,631 | 9/1931 | Horvath | 210/22 |
| 3,462,362 | 8/1969 | Kollsman | 210/23 F |
| 3,589,998 | 6/1971 | Rice et al. | 210/23 H |
| 4,032,454 | 6/1977 | Hoover et al. | 210/496 X |

*Primary Examiner*—Frank A. Spear, Jr.
*Attorney, Agent, or Firm*—Bailey, Dority & Flint

[57] ABSTRACT

A membrane separation apparatus utilizing hyperfiltration for permitting passage of a filtrate therethrough while rejecting a concentrated liquid medium is provided utilizing porous stainless steel membrane supports, wherein these supports are fabricated into a single pass configuration adapted for use at high pressures and substantial lengths, and wherein membrane is deposited in situ upon said supports after fabrication.

2 Claims, 3 Drawing Figures

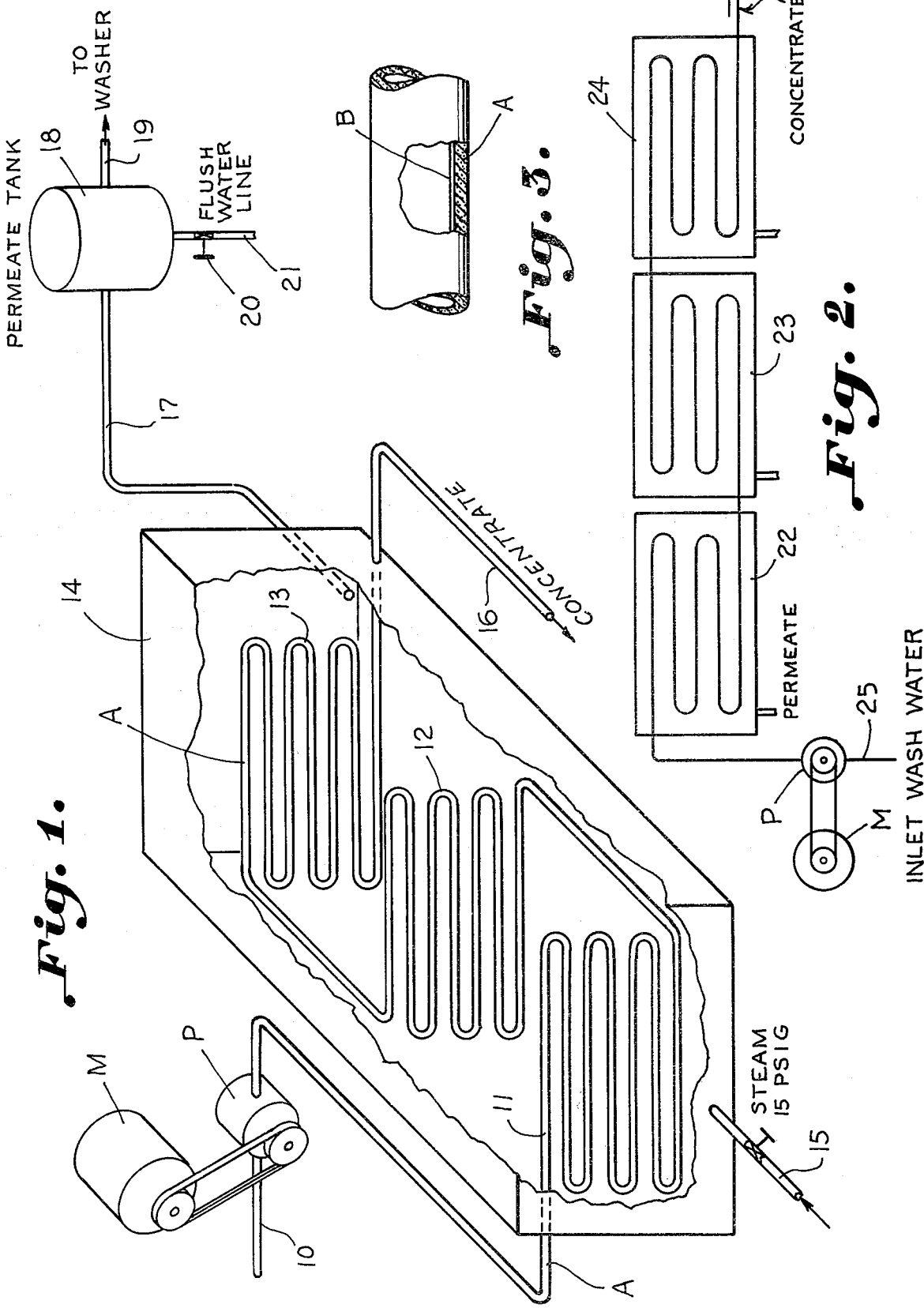

HYPERFILTRATION APPARATUS AND METHOD OF FLUID TREATMENT

BACKGROUND OF THE INVENTION

Hyperfiltration systems are generally of limited length, generally single support sections, due to the poor structural characteristics of the membrane supports which have been utilized in the past. Such membrane supports have been of limited structural strength because they are generally constructed of porous ceramic material, which includes carbon supports and the like. Thus, it has been necessary to fabricate a number of hyperfiltration modules which generally contain tubes in parallel with the modules staged in series such as illustrated in U.S. Pat. No. 3,998,740. According to the prior art as set forth in The Biennial Progress Report for the period Mar. 15, 1968 to Mar. 15, 1970, Separations Processing for the Office of Saline Water, U.S. Department of the Interior, membranes are unsatisfactory when used in connection with stainless steel porous tubes or support members. While supports heretofore employed had maximum lengths of generally about four feet single pass systems as contemplated herein are of substantial length.

Ceramic supports are not strong enough to be utilized in practical single pass systems of sufficient length for industrial uses such as in a textile finishing operation because they are not strong enough to withstand the pressures necessitated in such systems even if they could be fabricated and because such cannot be fabricated utilizing practical techniques of fabrication.

Accordingly, it is an important object of this invention to provide an integrated and continuous flow system which will cut down on horsepower requirements with improved separation characteristics.

Another important object of the invention is to provide a method of fluid treatment wherein wash water effluent from textile finishing processing containing polyvinyl alcohol or other textile sizing materials may be concentrated by removing permeate through hyperfiltration. The concentrate may be stored in a tank for re-use in the slasher of the textile finishing operation while the permeate may also serve wash water or as a flush water for the entire system.

Dye formulation recovery is another area of special usefulness in the textile industry but the invention has utility in treating industrial fluid treatment process effluents separating such effluents into a concentrate and a permeate of relatively pure water. Hyperfiltration as used herein contemplates the separation of suspended and dissolved materials including those removed by reverse osmosis as well as ultrafiltration.

BRIEF DESCRIPTION OF THE INVENTION

The invention contemplates the use of a porous stainless steel membrane support which may be fabricated into a single pass configuration for use in concentrating the effluent from fluid treatment operations such as textile finishing for re-use in the process. The invention is also useful for the recovery of dyestuffs and may be useful in desalinating water due to the unexpected discovery of the compatibility and economic feasibility of utilizing stainless steel permeable supports with a suitable membrane in a single pass continuous system of substantial length instead of the prior art short series systems. Such single pass systems are made possible through the structural strength and feasibility of the stainless steel and more than one single pass system may be utilized if dictated by production requirements.

The single pass configuration permits an approach to the theoretically ideal continuous membrane system to achieve concentration in chemical species in the processed fluid by the membrane separation technique without the necessity of recirculation of the fluid across any portion of the membrane surface. The porous stainless steel provides the strength to achieve this single pass design of substantial length and the in situ dynamic disposition makes fabrication practical.

It has been found that membranes inclusive of the types disclosed in U.S. Pat. Nos. 3,977,976, 3,743,595, 3,431,201, and 3,503,789, the disclosures of which are incorporated herein and made a part hereof by reference, may be utilized with stainless steel porous pipe such as supplied by Mott Metallurgical Corporation of Farmington, Connecticut, including, for example, those having about 0.5 micron pores. It has further been found necessary that welding or other conventional methods of fabrication be employed to fabricate first since damage would be done to the membrane if the membrane were applied first. It is preferred that the modules described herein be joined and installed prior to application of the membrane. The membrane is deposited internally of the stainless steel pipe by being dynamically formed in situ from flowing membrane such as disclosed in U.S. Pat. No. 3,503,789. It is important that it be possible to apply the membrane in the field so that if a problem develops after fabrication or in the field such may be readily corrected.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a schematic perspective view illustrating a fluid treatment apparatus constructed in accordance with the present invention utilizing the method hereof, FIG. 2 is a block diagram illustrating apparatus constructed in accordance with the present invention, and FIG. 3 is a side elevation, partially in section, illustrating a stainless steel tubular support and membrane constructed in accordance with the present invention.

DESCRIPTION OF A PREFERRED EMBODIMENT

The drawing illustrates a tubular hyperfiltration apparatus for increasing the concentration of an effluent for re-use in a fluid treatment process. An elongated continuous porous stainless steel pipe A has a suitable inlet portion. While the bends for attaching adjacent ends of adjacent pipe sections are imperforate the resulting construction is continuous in that a single pass structure is provided. A membrane B is supported by the stainless steel pipe and extends along the pipe. Means are provided introducing effluent at said inlet portion under pressure including the pump P driven by a suitable motor M. The pipe has sufficient strength to support its entire length under pressures necessitated in very long systems making possible a single pass construction so that an extremely long single pass configuration for treating industrial effluent for re-use is made possible. The invention contemplates advantageously utilizing effluent from textile finishing operations. The membrane is preferably carried on the inside of the pipe as illustrated.

The method contemplates utilizing a single pass configuration employing stainless steel supports with compatible internal membranes for increasing the concentration of effluent from a textile finishing operation for re-use in the system and continuously recycling such material within the system.

Referring more particularly to FIG. 1, the flow of effluent, in this instance wash water from the washer into the inlet 10 from whence pump P driven by motor M supplies the wash water under pressure to a continuous stainless steel support in the form of a pipe A which is illustrated as including a series of interconnected coils 11, 12, and 13 within a tank 14. Steam may be supplied to the tank 14 or other closure through the line 15 to raise the temperature of the liquid to improve the efficiency of the system and this heat exchange feature is an important added feature of the invention. Concentrate as, for example, 8% polyvinyl alcohol, is delivered from the line 16 for re-use in the fluid treatment operation. Permeate is pumped through the line 17 to a tank 18 from whence the clear water may be furnished to the washer through the line 19 or be utilized in cleansing the system by opening the valve 20 permitting the clear liquid to pass through the flush water line 21 to suitable connections for cleansing the system.

FIG. 2 illustrates the use of a number of modular units 22, 23 and 24 wherein wash water is passed into a continuous line 25 under pressure by the pump P driven by the motor M. The wash water passes through a continuous pipe disposed as coils within each of the modules 22, 23 and 24 passing out of the last module as a concentrate for further use in the system. FIG. 3 illustrates the porous stainless steel membrane support illustrated at A carrying internally the membrane B. Coils are formed in the module by welding adjacent sections of stainless steel pipe. The pipe sections are joined by welding or otherwise joining the ends of adjacent straight sections together to form a continuous unit or coil as the term is used herein. The coils may then be encapsulated in a larger closed pipe section or otherwise suitably constructed into the aforesaid modules.

EXAMPLE

The design objective was a capacity for 30 gallons per minute of 1.2% PVA (polyvinyl alcohol) wash water concentrated to 8%. The membrane area was determined by calculating the performance of each 6 foot long segment of ½ inch (or ⅝ inch) internal diameter tubing. The design calculations included the effects of pressure, velocity, temperature, and PVA concentration in each of approximately 230 segments.

The design is based on feed solution at 190 degrees F. To take advantage of the observed higher productivity and lower pressure drop at elevated temperatures, the system is designed for 210 degrees F. in the concentration range 4 to 8%. This requires heating 9 gallons per minute of the 30 gallons per minute from 190 to 210 degrees F.

The design function was determined from test data with pure PVA solutions. These data are consistent with data with wash water solutions from an operating finishing plant. All data were taken with dynamic membranes on porous stainless steel ½ inch diameter tubes.

The following table presents a comparison of the design flux and the experimental data.

| Concentration (%) | Design Flux (GFD) | Test Flux (GFD) |
|---|---|---|
| 1.2 | 76 | 75 |
| 4.0 | 10 | 15 |
| 6.0 | 4 | 5 |
| 8.0 | 0.8 | 1.5 |

The single-pass, modular configuration of the membrane area is possible because of the properties of porous stainless steel and dynamic membranes. The porous metal tubing can be fabricated into the long continuous, and varying internal diameter, configuration necessary to achieve single-pass operation. Dynamic membranes are formed from a circulating solution on the tube fabrication. Membrane cleaning and replacement are done, if needed, by simply circulating appropriate solutions. Single-pass operation inherently results in the best average flux since no increment of membrane area is exposed to higher concentration by recirculation.

The large pressure drops that occur in long, about 1500 feet, single-pass systems is achieved with a single pump because the strength of stainless tubing permits the necessarily high pressure. The tubing is capable of greater than 1000 psi working pressure so that the modular segments are designed for flow velocities that require 850 psi pressure drop.

OPERATION

The performance of the hyperfiltration recovery system was calculated for the range PVA concentration in the wash water from 0.7 to 1.7%. The system can deliver 8% concentrate for feed rates respectively of 12.5 gallons per minute and 8 gallons per minute. For feed solutions containing less than 0.25%, the pump capacity is exceeded and so the concentrate cannot be delivered at 8% therefore the concentrate is returned to the feed reservoir. The large diameter metal tubing and high pressure differentials together tend to minimize any possibility of plugging.

Because of the single-pass configuration, the pumping horsepower is simply the 30 gallons per minute capacity of the membrane area times the pressure differential achieved by the pump. This relatively small flow rate at high pressure is ideally provided by a very efficient positive displacement pump. For example, the 30 gallons per minute design requires only 25 horsepower.

While the term porous stainless steel pipe is used herein, it is to be understood that certain other metals including nichol titanium alloys may be utilized and it is intended that the term as used herein be inclusive of such additional materials.

Contrary to what would have been expected, it has been found that dynamically applied membranes are compatible with stainless steel pipe having large pore openings therein. Modular construction in prefabricated sections is possible to facilitate a single pass configuration where the membrane is applied for complete coverage after fabrication. The porous stainless steel may be augmented, for example by filter aid material such as carbon or ceramic powders, etc. or by chemical treatment, to facilitate the placement of membranes in the single pass configuration described herein.

The method contemplates the treatment of industrial fluid treatment effluent for re-use in a practical single pass configuration. Such configuration may be utilized also for processing waste where concentration is important to reduce volume of the waste. Toxic materials may also be removed advantageously from specific stages to avoid mixing with other effluent.

While a preferred embodiment of the invention has been described using specific terms, such description is for illustrative purposes only, and it is to be understood that changes and variations may be made without departing from the spirit or scope of the following claims.

What is claimed is:

1. A tubular hyperfiltration apparatus for increasing the concentration of an effluent in a fluid treatment process comprising:

a plurality of joined porous stainless steel pipe sections fabricated so as to be joined together in end-to-end relation in series forming a continuous membrane support;

said pipe sections being joined by means including welding adjacent ends thereof;

a membrane deposited upon said stainless steel pipe dynamically formed from a membrane forming liquid in situ after fabrication;

means introducing effluent at an inlet portion of said stainless steel pipe under pressure;

said porous stainless steel pipe having sufficient strength to support its entire length under pressure making possible a single pass construction;

means segmenting a plurality of said pipe sections into modules; and means joining said modules in series forming said continuous membrane support;

whereby an extremely long single pass configuration for treating industrial effluent is made possible by thus utilizing porous stainless steel membrane supports which are fabricated in single pass configuration utilizing membrane deposited in situ upon the support after joining of the sections into modules.

2. The structure set forth in claim 1 including means recycling effluent from said continuous membrane support for re-use in said process.

* * * * *